US006065672A

United States Patent [19]

Haycock

[11] Patent Number: 6,065,672

[45] Date of Patent: May 23, 2000

[54] METHOD FOR CURRENCY DISTRIBUTION AND MANAGEMENT

[75] Inventor: Richard Glen Haycock, Irving, Tex.

[73] Assignee: Currency Systems International, Irving, Tex.

[21] Appl. No.: 08/898,454

[22] Filed: Jul. 24, 1997

[51] Int. Cl.$^{7}$ ....................................................... G06F 17/60

[52] U.S. Cl. .......................... 235/379; 235/380; 235/383; 235/384; 235/437; 902/22; 902/24; 902/25

[58] Field of Search ..................................... 235/379, 380, 235/383, 384, 385, 435, 437, 492, 493, 479; 902/13, 14, 15, 16, 22, 24, 25, 26, 27, 28

[56] References Cited

U.S. PATENT DOCUMENTS

| | | |
|---|---|---|
| 3,222,057 | 12/1965 | Couri . |
| 3,304,080 | 2/1967 | Greenblott . |
| 4,463,250 | 7/1984 | McNeight . |
| 4,465,192 | 8/1984 | Ohba . |
| 4,677,682 | 6/1987 | Miyagawa . |
| 4,845,917 | 7/1989 | Omura . |
| 4,871,085 | 10/1989 | Graef . |
| 4,905,840 | 3/1990 | Yuge . |
| 5,012,932 | 5/1991 | Omura . |
| 5,099,423 | 3/1992 | Graef . |
| 5,105,364 | 4/1992 | Kawamura . |
| 5,478,992 | 12/1995 | Hamada . |
| 5,545,885 | 8/1996 | Jagielinski . |
| 5,570,465 | 10/1996 | Tsakanikas . |

*Primary Examiner*—Thien M. Le
*Assistant Examiner*—Daniel S. Felten
*Attorney, Agent, or Firm*—Carstens, Yee & Cahoon; Colin P. Cahoon

[57] ABSTRACT

A method for currency management and tracking utilizing a unique standardized cassette for the transportation of note bundles and loading of note bundles into currency processing apparatus, the cassette having an accompanying smart card on which data regarding the individual note history of each note contained therein and distributed therefrom is recorded. The invention further provides for the uploading of data stored on cassette smart cards to a central data bank, thus allowing for the management and statistical modeling of the currency pool.

10 Claims, 2 Drawing Sheets

FIG. 1
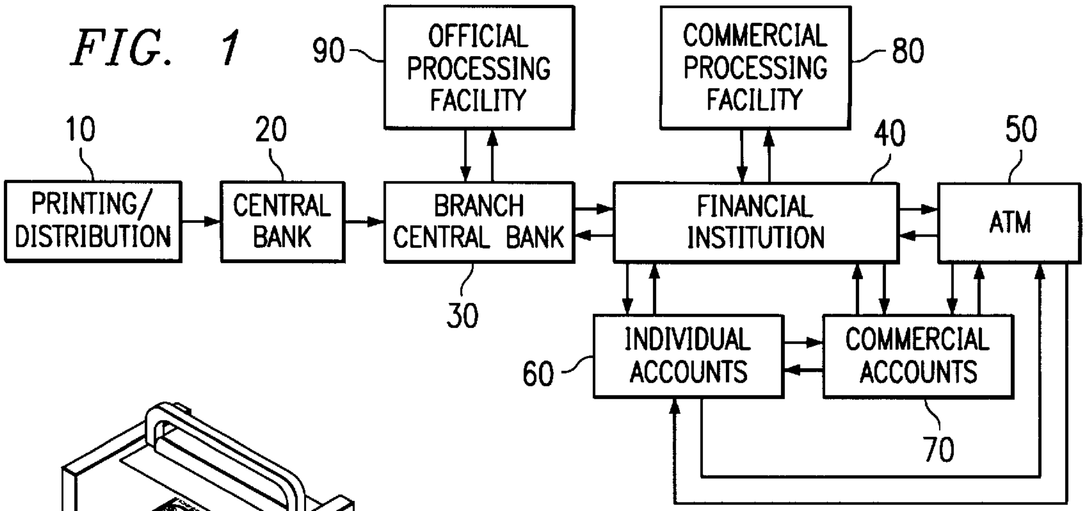
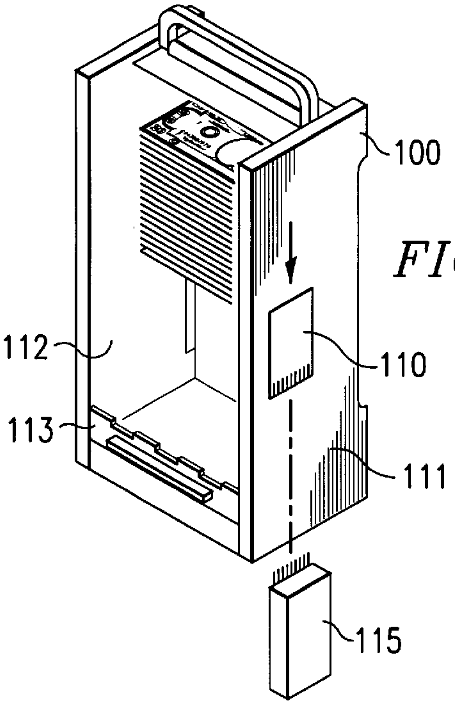
FIG. 2a
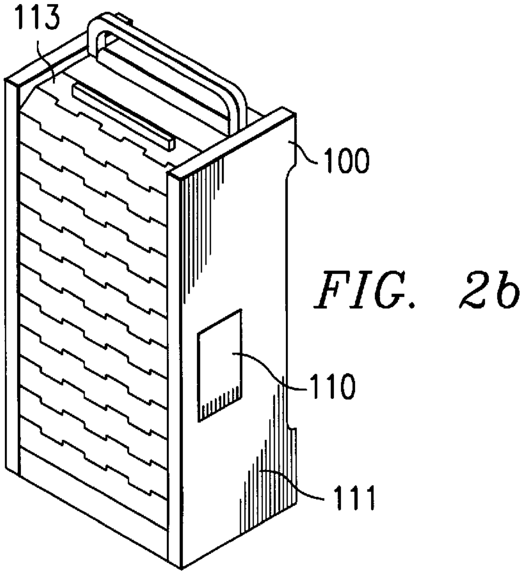
FIG. 2b
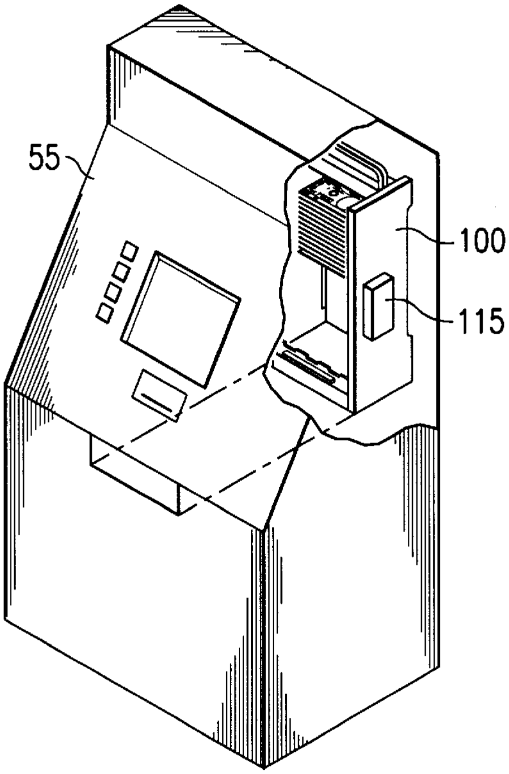
FIG. 3

METHOD FOR CURRENCY DISTRIBUTION AND MANAGEMENT

TECHNICAL FIELD OF THE INVENTION

The field of this invention relates to the efficient distribution, management and tracking of a currency using currency processing machines, automatic teller machines, and other currency accounting, processing, and distribution equipment in combination with unique cassette devices for transporting note bundles.

BACKGROUND OF THE INVENTION

Presently, large volumes of national currencies remain in circulation with no capability for tracking individual notes or management plans in place to take advantage of information collected during periodic processing of individual notes. For example, at any given time vast numbers of individual notes of United States currency are in circulation throughout the world. These notes are collected, held, and distributed by various institutions, individuals, and government entities. An individual note may be haphazardly processed at unpredictable intervals during its circulation lifetime. Eventually, the note may be lost, destroyed, collected, or otherwise taken out of circulation. Interspersed with this large volume of currency notes are the inevitable counterfeits which, many times, duplicate in many respects, including specific serial number, a virtually identical legal tender note that is concurrently in circulation.

A method for currency management and tracking that accumulates statistics on the circulation history of notes and accurately identifies the last distribution, receipt, or processing of individual notes could provide a currency issuance authority or other entities involved in the processing and distribution of currency with a powerful tool for the management of currency and the maintenance of significant integrity of the currency pool with rapid recognition of counterfeit intrusions into this pool. Such a method would also greatly increase the security of note distribution and processing by providing better accounting of each note.

A need exists for improved management of notes in circulation. Management of notes would include obtaining, tracking and comparing the circulation history of individual notes while also increasing distribution efficiency. Circulation history of an individual note could include the note's specific serial number or other unique identifying characteristics, movement history, fitness characteristics, and other physical characteristics. It is the need for efficient distribution, better management, and accurate tracking of currency notes which is addressed by the present invention.

In addition, the prior art methods for distribution of currency involve several labor steps that increase opportunities for accounting problems and theft and add to the time involved in dispersing the currency. No standardized container exists which is adaptable to the various equipment utilized in the currency processing, collecting, and dispersing cycle. Consequently, note bundles must be reconfigured for each different step in the distribution process. Thus, a need also exists for a currency container that reduces the need for reconfiguring note bundles, thereby increasing security and reducing labor steps.

SUMMARY OF INVENTION

This invention relates to a method for currency distribution and management involving the detection, assimilation, cataloging, and tracking of individual note circulation history. This invention utilizes a standardized detectable note circulation history which is tracked throughout the circulation life of each individual note. This circulation history includes at least one distinct note identifier, such as a serial number, several physical characteristics of the note, and the movement history of the note through circulation. The method utilizes various currency processing, detecting, receiving, and distribution technologies of the prior art in combination with unique cassettes for standardized transportation of note bundles along with data on the note history of each note in the bundle. The resulting method provides for precise management of a pool of currency notes and the individual tracking of specific notes in circulation. The method also increases the efficiency and security of note distribution.

Critical goals of the invention include the ability to provide real time data on a pool or sample population of notes in order to make statistical determinations of currency life expectancy models, distribution and use patterns, and maintain the integrity of the entire currency population with regards to its resistance to counterfeit circulation. These critical goals, as well as an additional goal of increased security in the circulation of notes, require the tracking of individual notes in order to maintain a history on each individual note. By maintaining such individual note history, statistical models for the currency population at large can be built by analyzing sample note circulation histories. In addition, the tracking of individual notes allows for rapid recognition of duplicate individual note identifiers, thus thwarting counterfeit attempts. For example, the invention might identify two notes of the same denomination with identical serial numbers. Such information would flag the intrusion of a counterfeit note into circulation, since no two notes of the same denomination should have identical serial numbers. The note history associated with the duplicate serial number could also provide information leading to the date when, and location at which, the counterfeit note entered circulation. Tracking of individual notes also provides increased security throughout the collection, processing, and distribution of currency by identifying each significant event in the note's circulation history by date, location, and possibly individual account or institution code.

The invention's goal of increased security, as well as an additional goal of increased distribution efficiency, is also addressed by use of standardized cassettes to transport bundles of notes. These cassettes can be adapted for use in prior art apparatuses used to handle currency in circulation, such as currency processing machines and automatic teller machines ("ATMs"). These cassettes have a built-in "smart card" for storage of the circulation note history of each note contained therein. By standardizing the cassettes for adaptation to a number of currency handling apparatuses, and by allowing for data on each note to accompany the note on a cassette's smart card, the secure transportation of the note bundle from location to location is increased as is the accountability of each note throughout its circulation. Standardized cassettes also promote efficiency in the distribution of notes by eliminating the need to repackage note bundles for different applications in the distribution cycle.

The invention begins by identifying a set standard for the data to be included as note circulation history for each individual note. This note circulation history data includes at least one identifier unique to each note, for example each note's serial number. The note circulation history also tracks a set number of physical characteristics which might include soiling characteristics, limpness characteristics, or other detectable physical characteristics. Finally, data is accumulated on each note's movement as detected during various phases of the present invention method. Once the data parameters of a note circulation history are defined, data can be accumulated on this history at various points in the distribution chain.

By way of example, a newly printed note is cataloged for its serial number, date and place of printing, and first destination from the printing facility. The date and place of printing and first destination becomes a part of that note's circulation history. Similar data on the new note's movement is accumulated at the point of distribution to the public. The note can then be identified, for example, to a specific bank or financial institution location with a specific arrival date at same. The note can further be identified to a specific ATM for distribution or a specific bank teller's cash drawer. The circulation history could further identify the specific date and location of distribution and the specific bank account identified with the distribution. Likewise, when an individual note is returned to a bank or other financial institution, data on the note's movement is accumulated indicating the date and place of receipt and, possibly, the individual account associated with the receipt.

After return of the note to a financial institution the note might be sent to a central processing location. Typically, these processing locations utilize prior art, high speed currency processing machines which detect certain physical characteristics of individual notes and sort notes into specific denominations. The movement history would reflect that the note was shipped to such processing facility for processing. Added to the overall note history would be the physical characteristics detected by the currency processing machine at this processing facility. The distribution point from the currency processing facility to the next distribution facility would next be recorded for the note's history.

Cassettes, typically plastic storage boxes of several standard sizes, are presently widely used to hold notes for distribution in an ATM. Facilitating the collection and tracking of note circulation history in a diverse distribution network is accomplished by the present invention's use in the distribution network of standardized cassettes of note bundles having data storage capacity. For example, whenever a standardized bundle of currency is processed it is placed into a cassette for storage and transportation of the notes. These cassettes could be reusable or disposable and could be color-coded to identify the denomination contained therein. A smart card with data storage capability is physically associated with each cassette. The note circulation history for each of the notes contained in the cassette is placed on the smart card simultaneous to, or immediately after, loading the cassette with the notes. The notes so bundled in a cassette can be maintained in this configuration until it is necessary to distribute individual notes. At this point in the present invention's distribution process, information regarding each individual note distribution can also be read onto the smart card of the cassette while the note is being distributed. The information stored on the smart card can later be uploaded to a central data system to provide tracking information on each individual note distributed from the cassette.

By way of example, a standardized cassette is attached to a $20 denomination output of a high volume currency processing machine at a centralized processing facility. This cassette is color coded to identify the $20 denomination. The empty cassette is then filled with notes of $20 denominations which have been processed by the machine. As each note is inserted into the cassette, information regarding the note circulation history for each note is loaded onto the smart card for the cassette. This information includes the serial number for the specific note and its previous movement history. Information regarding the detected fitness level of each note, accumulated by the currency processing machine, is also included in the standard note circulation history. When the cassette has been filled with a standard amount of notes, for example 2,000, the cassette is then sealed by tamper-proof means and shipped to the next point in the distribution chain. Eventually, the cassette might be loaded directly into an ATM. As individual notes are removed from the cassette for distribution, an optical code reader in the ATM detects the serial number (or other distinct note identifying feature) of each note removed. This serial number is then identified to the specific account on which the withdrawal is made. The withdrawal information, including the specific serial number of notes distributed, the account to which the withdrawal is debited, and the date and location of the distribution, is then read back into the smart card of the cassette. When the cassette is removed from the ATM, information can be immediately obtained on the number and serial number of notes remaining in the cassette. In addition, the updated note circulation history on each distributed note is uploaded to a centralized data management system. The information in the centralized data management system can later be compared with information on the note when it is next detected by the described method.

By color coding the cassettes, note bundles can be easily distributed to various users of the notes. As long as the user requests denomination bundles in the standard cassette amount (2,000 notes in the above example), there is no need to re-collate note bundles for shipment from point to point in the distribution cycle.

By allowing for such detailed tracking of individual notes and the management of the overall distribution of notes, the present invention provides a powerful tool for the management of currency pools and the detection of counterfeit notes. The present invention also provides more accurate accounting methods and greater security by allowing for the traceability of notes through each individual step in the distribution and collection process and promotes efficiency by the use of standardized cassettes.

This present invention is a substantial improvement over the prior art in providing increased management capability, security, and accounting of currency as well as efficiency in distribution.

BRIEF DESCRIPTION OF THE DRAWINGS

Further objects and advantages of the present invention will become apparent from the following detailed description when read in conjunction with the accompanying drawings, in which:

FIG. 1 is a flow chart demonstrating a typical currency distribution system;

FIGS. 2*a* and 2*b* are perspective views of a standardized cassette of the present invention;

FIG. 3 is a perspective view of an Automatic Teller Machine with a standardized cassette installed; and, FIG. 4 is a perspective view of a currency processing machine with standardized cassettes installed.

DETAILED DESCRIPTION OF PREFERRED EMBODIMENT

Figure 4:
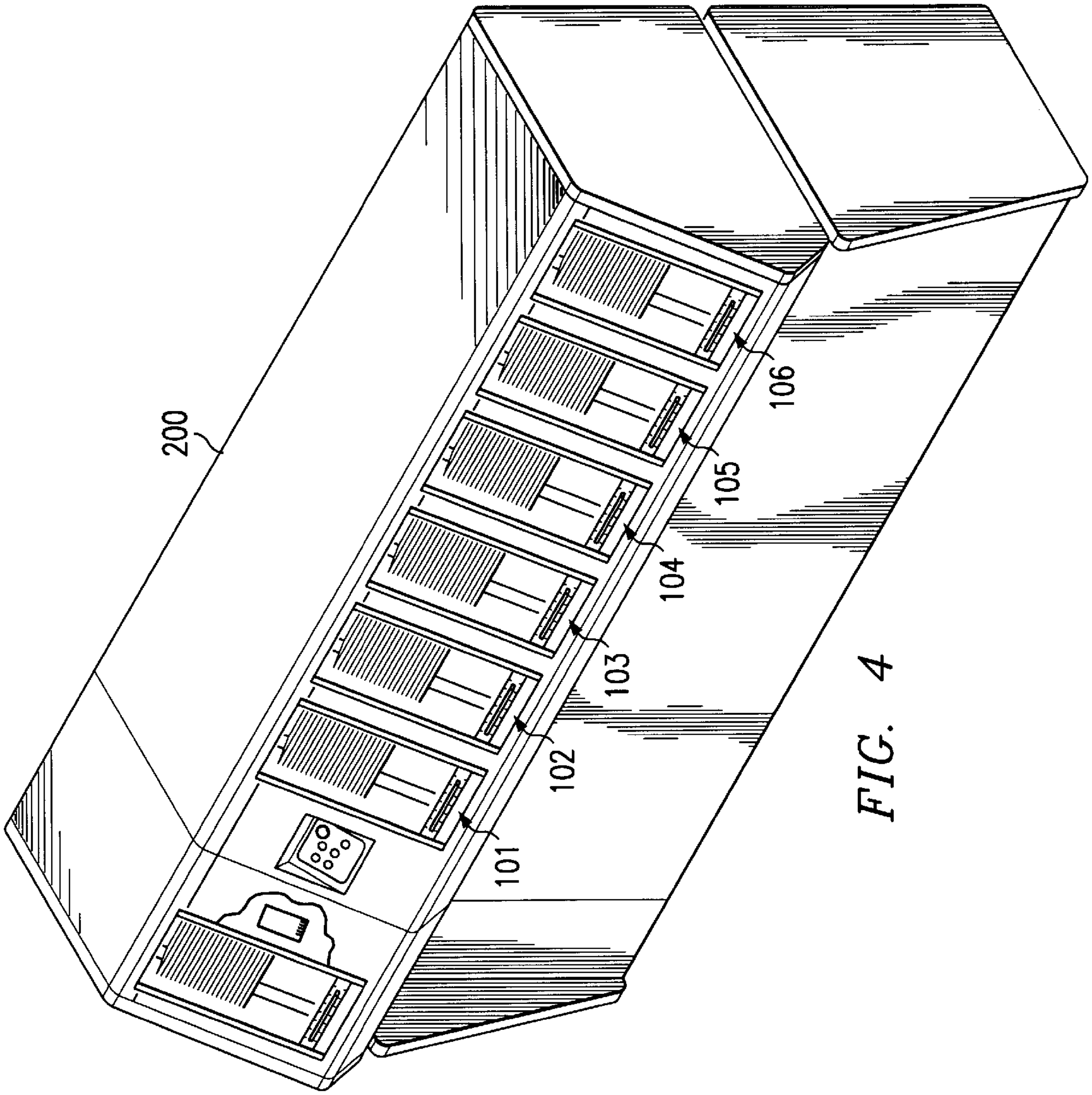

The present invention is best understood by first reviewing, in general terms, the various stages of the currency distribution process. FIG. 1 shows a flow chart illustrating an example of a present currency distribution system. Each of the numbered items shown in FIG. 1 can be generally referred to as nodes of a note's circulation. The distribution process is begun with the printing of individual notes, for example, at a government printing facility 10. Notes are then shipped to a central bank 20. The central bank then distributes the notes to one of several branches of the central bank 30. The currency is next shipped to a financial institution 40, such as a commercial bank. From the financial institution 40, the currency can enter into the general public circulation, sometimes referred to as the retail cycle of currency distribution. Currency typically enters this retail cycle by distribution to a financial institution's individual account holder 60 through the use of ATMs 50 or directly from a teller's cash drawer at the financial institution 40 to the individual account holder 60, or by distribution to one of the financial institution's commercial accounts 70. Once distributed from a financial institution 40, currency circulates between individual accounts 60 and commercial accounts 70. At some point, individual notes are ultimately returned to a financial institution 40. This can occur through individual deposits to a bank teller's drawer at the financial institution 40, commercial or individual deposits to an ATM 50 controlled by the financial institution, or commercial deposit directly to the financial institution 40. Notes returned to a financial institution can be immediately placed back into the retail cycle or sent to a commercial processing facility 80 for processing. This commercial processing facility 80 counts, authenticates, sorts, and detects fitness levels for the notes processed. Once the notes have been processed, they are returned to a financial institution 40. Notes of poor fitness quality are separated by the commercial processing facility 80, returned to the financial institution 40, and then sent back to a branch of the central bank 30 for credit to a financial institution's 40 account, or exchange for newer, fit notes. Notes are also occasionally returned from a financial institution 40 to a branch of the central bank 30 for the purpose of crediting the financial institution's account at the central bank 20. Notes received by a branch of the central bank 30 from a financial institution are processed by the central bank's official processing facility 90. This official processing facility counts, authenticates and destroys unfit notes. The fit notes are returned from the official processing facility 90 to a branch of the central bank 30 for redistribution to financial institutions 40.

It is within the context of the system and various nodes of a note's circulation generally described in FIG. 1 that the present invention works to achieve the goals of providing real time data on a pool or sample population of notes in order to make statistical determinations of currency life expectancy models, distribution and use patterns, maintaining the integrity of the entire currency population with regards to resistance to counterfeit circulation, increasing security of the entire system, and reducing labor steps relating to the transportation of currency. Referring again to FIG. 1, one preferred embodiment of the present invention can be best illustrated by tracking a single note through its circulation history. One critical feature of the present invention, the standardized cassette, will be frequently referred to and is illustrated in FIGS. 2*a* and 2*b*. The standardized cassette 100 is integrated throughout the process. This cassette 100 contains a smart card 110 capable of storing electronic data reflecting the note history for all the notes found within the cassette 100. Data can be downloaded to or uploaded from the smart card 100 via a standardized coupling device 115 which can couple with the smart card magnetically, physically through electric connections, or optically.

Referring again to FIG. 1, the exemplar note illustrating one preferred embodiment is first printed, for example, at the government printing facility 10. This note is bundled with notes of the same denomination into the standardized cassette 100 illustrated in FIGS. 2*a* and 2*b*. Data on each note found within the cassette is entered onto the smart card 110. At this point in the distribution cycle, data would be entered for the exemplar note recording its serial number, date and place of printing, denomination, and all other data fields would be programmed to show that it is a new note. The cassette 100, filled with the new notes from the printing facility, would then be sealed through tamper-proof means, for example, a specialized shrinkwrap that seals access to the contents of the cassette but allows for access to the smart card 110. The cassette 100 could additionally be color coded to easily identify the denomination of notes transported therein.

The cassette 100 is then physically transported from the printing facility 10 to a central bank 20. Upon arrival at the central bank 20, an entry can be made on the cassette smart card 110 updating the note history of each note to indicate its date of receipt at the central bank 20. The cassette 100 would next travel to a branch of the central bank 30. Again, upon receipt by the branch of the central bank 30, the smart card 110 would be updated to show that the notes contained therein had all arrived at the branch for the central bank 30.

The cassette is next transported to a financial institution 40. Upon arrival at the financial institution 40, the smart card 110 is again updated to reflect that the notes have all arrived at a specific financial institution 40 on a specific date. The cassette 100 can then be utilized directly in ATMs 50 controlled by the financial institution 40. Without the need for rebundling or recollating any of the denomination notes, the cassettes 100 can be placed directly into a specific ATM 55, as further shown in FIG. 3. Upon installation into the ATM 55, the smart card 110 can again be updated to indicate that the notes found therein had made their way to a specific ATM 55 and been installed on a specific date.

Disbursements from the ATM 55 are tracked by an optical reader so that each individual note taken from the cassette 100 is identified as it leaves the ATM 55. The ATM 55 can then record to the cassette smart card 110 by way of the coupling device 115 the specific distribution data for each note. For example, a specific note might be distributed to a single bank customer on a specific date. All the information regarding this withdrawal would be recorded on the smart card 1 10. The smart card 110 is capable of receiving and storing note history data and contains adequate memory capacity to store such information for all notes contained within the cassette 100. The smart card 110 can also be designed with tamperproof features in order to maintain security and the integrity of a note's history. When the caste 100 is later retrieved from the ATM 55, data from the smart card 110 can be uploaded to a centralized data bank. For the exemplar note involved, this central data bank would record the account debited, the date of the withdrawal, and the location of the disbursement.

Referring back again to FIG. 1, the exemplar note could just as likely have first been distributed through an individual teller's cash drawer at the financial institution 40. The smart card 110 on the cassette 100 would show that the cash therein was removed from the cassette for distribution in the individual teller's drawer. That information can again be uploaded to a centralized data bank to track the notes and the cassette to the specific teller's cash drawer at a specific location for distribution on a specific date.

The exemplar note might also have first been distributed to one of the bank's commercial accounts. It is anticipated that many of the commercial accounts that utilize currency in high volumes might request standardized cassettes 100 as a preferred bundling of notes distributed to them. In which case, the smart card 110 would again be updated to show the transportation of the cassette 100 to the specific commercial account.

Eventually, the vast majority of notes distributed as described above will be returned to a financial institution 40. As the notes are rebundled into standardized cassettes 100, the financial institution 40 would have the option of recording on the smart card 110 for the cassette the receipt date of the notes and the specific accounts related to the note deposits. This cassette 100 could then be sent to a commercial processing facility 80 for counting, authenticating, sorting, and a fitness check. The cassette 100 is loaded directly into a currency processing machine 200 as shown in FIG. 4. The information gathered on each individual note is again stored on a smart card 110 for cassettes 101, 102, 103, 104, 105, 106 loaded from the output of the currency processing machines, as shown in FIG. 4. The note history on each individual note which was earlier sent to a central data bank can also be compared with the note information gathered during processing. The central data bank can then be updated and the information from the central data bank which should accompany the note is then further added to the smart card 110 for the cassette. Fit notes are then returned to the financial institution 40 in a standardized cassette 100, with entries made on the smart card 110 for the receipt date of the specific financial institution.

A similar procedure is followed when cassettes 100 are returned to the branch of the central bank 30 and sent to the official processing facility 90. Data is loaded on the smart card 110 identifying the originating financial institution and the date of shipment to the central bank 30. The receipt date at the central bank 30 is then added to the smart card 110. The cassette 100 is then sent to the official processing facility 90, and the date of shipment and receipt is, once again, noted on the smart card 110. At the official processing facility 90, high-speed currency processing machines 200 such as shown in FIG. 4, are used to count, authenticate, and destroy unfit notes. Fit and counted notes are returned to the appropriate discharge slot, for example, the discharge slot holding cassette 101 in FIG. 4, and the cassette is sealed and shipped back to the branch of the central bank 30 for re-distribution into the public sector. Prior to shipping the example cassette 101 back to the branch of central bank 30, the note history for each individual note contained therein is recorded on the cassette 101 smart card 110.

At various points throughout the process described above, for example at the official processing facility and commercial processing facility, note history data on individual notes is uploaded from cassette smart cards 110 into a central data bank. Information on each individually identified note can then be compared and updated. Thus, a statistical database is developed for determining currency life expectation models, distribution and use patterns, and maintaining the integrity of the entire currency population with regards to resistance to counterfeit circulation. When an individual note is destroyed at the official processing facility 90, this information is likewise transmitted to the central data bank for inclusion on the specific note's circulation history. If serial numbers are not reused by the printing facility 10, any note that is subsequently reported utilizing a destroyed note's serial number would be immediately identified as a counterfeit. The note history on this counterfeit bill could be traced back to a very specific receipt location, for example a particular deposit in an ATM 50, and this information could be used in tracking down the original source of the counterfeiting.

The examples given above are but a few of the myriad of possible migrations of individual notes throughout the distribution system. The described invention pulls together, as much as possible, all the various functions of the distribution system to best track the distribution history of individual notes as these notes make their way through various types of financial institutions, commercial accounts, individuals, and various processing facilities. The use of the standardized cassette 100 during shipments throughout the distribution cycle eliminates labor steps involved in recollating note bundles, thereby reducing chances for theft and accounting errors. The use of these standardized cassettes with various machines used in the distribution and collection of currency, for example ATMs 55 and high-speed currency processing machines 200, also eliminates labor steps, increases security and assists in maintaining the integrity of the currency population.

FIG. 2*a* shows a preferred embodiment of a standardized cassette 100 showing the smart card 110 located on a side panel 111 of the cassette 100. It is understood that this smart card 110 could be located anywhere on the cassette 100, as long as the location facilities an easy and standardized access for interface with the coupling device 115. Notes are loaded into the interior chamber 112 of the cassette 110. When the interior chamber 112 is filled with notes, a rolling door 113, shown as open in FIG. 2*a* and closed in FIG. 2*b*, can be secured by a tamperproof means prior to shipment. This tamperproof means includes the use of a plastic shrinkwrap. As noted earlier, the cassette 100 itself could be color-coded to correspond to the denomination of notes held therein, or the shrinkwrap might be color-coded for this purpose as well. This standardized cassette 100 with smart card 110 plays a critical role in the present invention through both its use as a standard bundle of currency during shipments to the various currency users and because of its adaptability in the various apparatus used in handling and processing currency.

It would also be understood that changes in the details, materials, methods, and arrangements of the present invention, which has been described and illustrated in order to explain the nature of the invention, may be made by those skilled in the art within the principle and scope of the invention as expressed in the following claims.

I claim:

1. A method of currency control comprising the steps of:

(a) recording a serial number from a currency note;

(b) releasing the currency note into circulation;

(c) tracking the currency note through at least one node of its circulation; and, (d) storing the recorded serial number in a memory device attached to a currency storage device in which the currency note is transported.

2. A method of currency management comprising the steps of:

(a) recording an identifier from a currency note;

(b) releasing the currency note into circulation;

(c) tracking the currency note's circulation through at least one node of its circulation;

(d) recording at least the identifier as data at said node; and (e) storing the recorded data in a memory device attached to a currency storage device in which the currency note is transported.

3. The method of claim 2 further comprising:

(f) transferring the recorded data from the memory device to a central data bank; and (g) creating a note circulation history for each currency note from the recorded data.

4. The method of claim 3 further comprising:

(h) analyzing the note circulation history for location and usage patterns.

5. The method of claim 2 further comprising:

(f) using the recorded data to trace the circulation of counterfeit currency notes back to a node of its circulation.

6. A method of currency management comprising the steps of:

(a) recording an identifier from a currency note;

(b) transporting the currency note in a currency storage device wherein said currency storage device comprises:

(i) a storage compartment for holding a plurality of currency notes;

(ii) a smart card having a memory for recording an identifier for the currency notes; and, (iii) a coupling device for interfacing with said smart card; and, (c) tracking said currency note in circulation through at least one node of its circulation.

7. The method of claim 6 wherein the currency storage device storage compartment is sealable.

8. The method of claim 6 wherein the currency storage device coupling device allows for the uploading of data into the smart card.

9. The method of claim 6 wherein the currency storage device coupling device allows for the downloading of data from the smart card.

10. The method of claim 6 wherein the currency storage device smart card records the identifier into a data structure for comparison and retrieval.

* * * * *